US009836796B2

(12) United States Patent
Kuster et al.

(10) Patent No.: US 9,836,796 B2
(45) Date of Patent: Dec. 5, 2017

(54) SYSTEM AND METHOD FOR COMPREHENSIVE SALES AND SERVICE EVENT PROCESSING AND REPORTING

(71) Applicant: Capital One Financial Corporation, McLean, VA (US)

(72) Inventors: William Kuster, Richmond, VA (US); Srirarama Gautham Tanikella, Henrico, VA (US); Vikram Pakanati, Richmond, VA (US); Tracie G. Meador, Powhatan, VA (US)

(73) Assignee: CAPITAL ONE FINANCIAL CORPORATION, McLean, VA (US)

( * ) Notice: Subject to any disclaimer, the term of this patent is extended or adjusted under 35 U.S.C. 154(b) by 0 days.

(21) Appl. No.: 14/208,660

(22) Filed: Mar. 13, 2014

(65) Prior Publication Data

US 2014/0279307 A1 Sep. 18, 2014

Related U.S. Application Data

(60) Provisional application No. 61/783,350, filed on Mar. 14, 2013.

(51) Int. Cl.
*G07B 17/00* (2006.01)
*G06Q 40/00* (2012.01)

(52) U.S. Cl.
CPC .................... *G06Q 40/12* (2013.12)

(58) Field of Classification Search
None
See application file for complete search history.

(56) References Cited

U.S. PATENT DOCUMENTS

| 7,676,423 | B2* | 3/2010 | Avery | 705/37 |
| 8,468,090 | B2* | 6/2013 | Lesandro et al. | 705/39 |
| 2002/0169658 | A1* | 11/2002 | Adler | 705/10 |
| 2005/0171833 | A1* | 8/2005 | Jost et al. | 705/10 |
| 2005/0197857 | A1* | 9/2005 | Avery | 705/1 |
| 2005/0262008 | A1* | 11/2005 | Cullen et al. | 705/37 |
| 2006/0059062 | A1* | 3/2006 | Wood et al. | 705/35 |
| 2006/0253580 | A1* | 11/2006 | Dixon et al. | 709/225 |
| 2009/0143128 | A1* | 6/2009 | Cautley et al. | 463/17 |
| 2010/0125525 | A1* | 5/2010 | Inamdar | 705/80 |
| 2011/0035287 | A1* | 2/2011 | Fox | 705/14.69 |
| 2012/0054095 | A1* | 3/2012 | Lesandro et al. | 705/39 |
| 2014/0122178 | A1* | 5/2014 | Knight et al. | 705/7.31 |

* cited by examiner

*Primary Examiner* — Fateh M Obaid
(74) *Attorney, Agent, or Firm* — Hunton & Williams LLP

(57) ABSTRACT

Example systems and methods provide comprehensive sales and service data processing and reporting. Sales and service events that take place at a front end branch of an enterprise may be input into a front end system and transmitted to a backend system where various modules then use the front end system data to generate various data and reports to determine sales incentive metrics and key performance indicators.

16 Claims, 5 Drawing Sheets

SYSTEM AND METHOD FOR COMPREHENSIVE SALES AND SERVICE EVENT PROCESSING AND REPORTING

CROSS-REFERENCE TO RELATED APPLICATIONS

This application contains subject matter related to and claims the benefit of U.S. Provisional Patent Application No. 61/783,350, filed on Mar. 14, 2013, the entire contents of which is incorporated herein by reference.

This application contains subject matter related to U.S. patent application Ser. No. 14/211,230, entitled "A System and Method for Comprehensive Sales and Service Metric Reporting," filed on Mar. 14, 2014, the entire contents of which is incorporated herein by reference.

FIELD OF DISCLOSURE

The present disclosure relates to systems and methods for comprehensive sales and service data processing and reporting.

BACKGROUND OF THE DISCLOSURE

Financial institutions may include a number of local branches, where each local branch may have its own employees, including branch associates and branch leadership. In order to effectively manage branch performance, various metrics associated with the local branch may be maintained and reported. These metrics are typically provided in various reports that are not standardized. For example, a branch bank may rely on over 150 metrics that are incorporated into dozens of reports which are used to attempt to assess, understand, and manage branch sales and service performance. These reports may also be used to determine associate compensation and therefore may serve to incentivize branch employees to participate in particular sales and service tasks. But the data for these reports comes from disparate sources that are not standardized or formatted in a way to provide data consistency to reporting and incentive systems. Without an effective way for these reports to provide transparency into the branch performance and branch needs, these reports may be fruitless. These and other drawbacks exist.

SUMMARY OF THE DISCLOSURE

Example embodiments of the disclosure provide systems and methods for sales and service event processing and reporting. An example system includes a computer processor that receives, via a network, front end system data from a front end system, wherein front end system data includes sales and service data relevant to the front end system, a first data processor that categorizes the front end system data according to account specific data and non-account specific data, thereby generating first data, a second data processor that processes the first data according a set of second data processing rules thereby creating a second data, the second data processing rules including at least one of: aggregation of the first data according to a first selected variable; normalization of the first data; and standardization of the first data, and a third data processor that processes the second data according to a set of third data processing rules thereby creating a third data, the third data processing rules including aggregation of the second data according to a second selected variable.

An example method includes receiving, via a network, data from a front end system, categorizing, using a first data processor, the data according to account data and non-account data, thereby creating a first data, processing, using a second data processor, the first data according to at least one first processing rule to generate a second data, the at least one first processing rule including at least one of: aggregation of the first data according to a first selected variable; normalization of the first data; and standardization of the first data, processing, using a second data processor, the second data according to a second processing rules including aggregation of the second data according to a second selected variable to generate a third data.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF PREFERRED EMBODIMENTS

Figure 1:
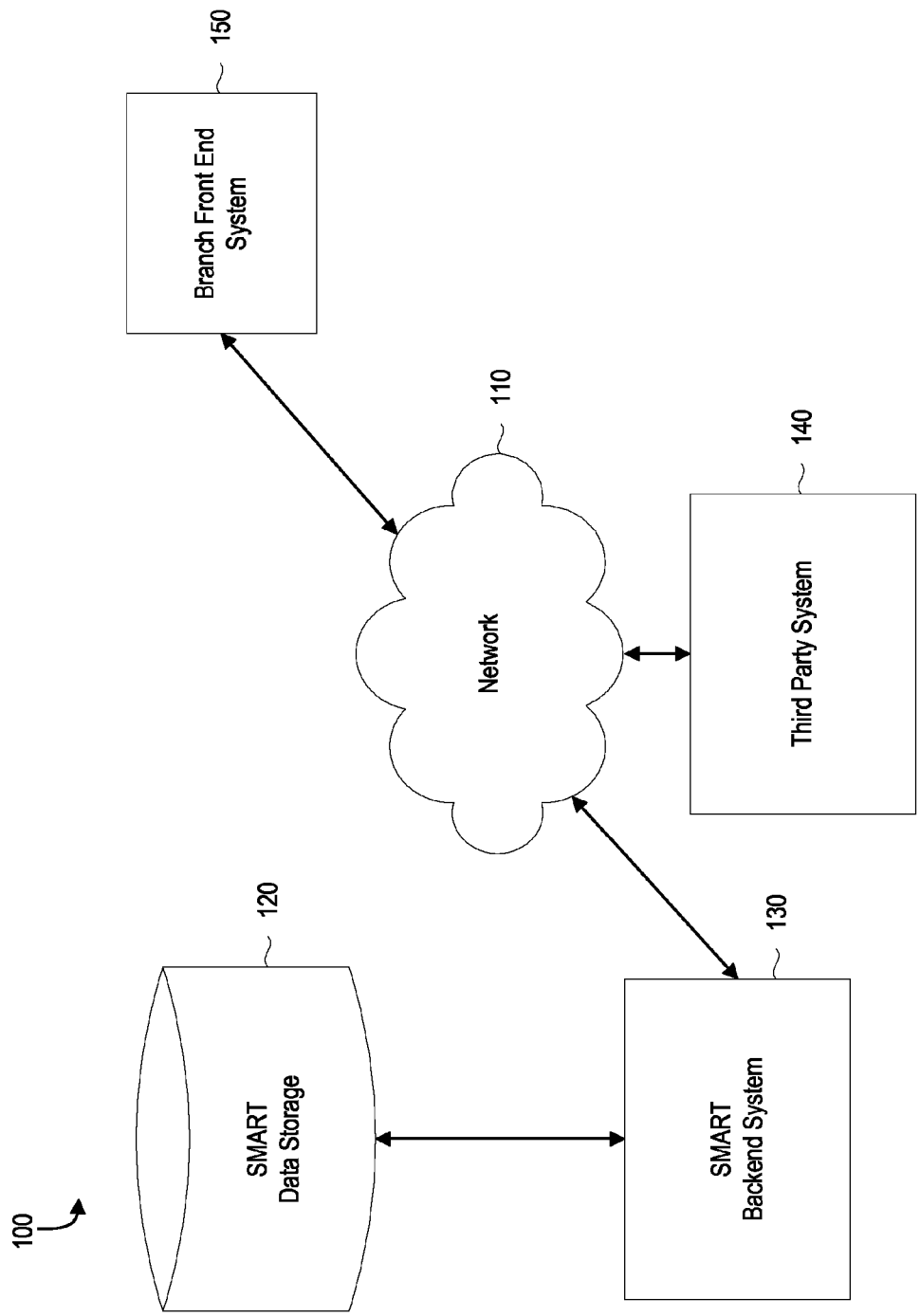
FIG. 1 is a schematic diagram illustrating an example system for comprehensive sales and service event processing and reporting.

The following description is intended to convey a thorough understanding of the embodiments described by providing a number of specific example embodiments and details involving systems and methods for comprehensive sales and service event processing and reporting. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in various embodiments, depending on specific design and other needs. A financial institution and system supporting a financial institution as used as examples for the disclosure. The disclosure is not intended to be limited to financial institutions only.

According to various embodiments of the present disclosure, systems and methods enable comprehensive sales and service event processing and reporting. The embodiments described herein relate to financial institution sales and services (e.g., bank branch sales and services), but one of ordinary skill would understand that other like sales and services (e.g., auto sales and services, big box retail, food sales and service, and/or the like) could implement similar sales and services event reporting and processing systems as shown and described herein. In the various examples, generating and processing data associated with branch and branch associate performance may be paramount to branch success if the data is reflective of actual performance and is processed to produce a report reflective of a user's needs, such as the needs of branch management or the needs of a branch associate. The needs of a user may vary based on how the user wishes the use the report. For example, a branch associate may wish to use a report to determine a difference between actual performance and a goal performance on a month-to-date (MTD), quarter-to-date (QTD) and year-to-date (YTD) level. A branch manager may wish to use a report, for example, to determine a ranking of branch associates based on an actual performance to goal performance ratio over a particular time period, such as MTD, QTD, and/or YTD.

In an example embodiment, a front end system of, for example, a branch front end system may be connected via a network to a backend system, which may be connected to a data storage. A branch front end system may provide a variety of services and sales opportunities and the data used to provide those sales and service activities may be sent to a backend system for processing and storage in a data storage unit. By way of example, services and sales opportunities may include: credit card account sales, savings account sales, checking account sales, home loan sales, auto loan sales, Roth IRA account sales, Traditional IRA account sales, 401K account saves, 403b account sales, Coverdell account sales, 529 account sales, credit card sales business checking account sales, business saving account sales, business credit card sales, business loan sales, direct deposit services, rollover account services, bill pay services, deposit services, withdrawal services, referral services, activation services, and the like. Moreover, employee hours and branch hours may be recorded as well at a branch front end system.

While sales and services described above may relate to banking branch sales and services, sales and services may relate to any type of sales or services a branch may provide. For example, retail branches may record retail sales and returns; restaurant branches may record food and drink sales by course of meal and up-sell sales; and pharmaceutical and medical device companies may track various pharmaceutical and medical device sales. In other examples, sales and service opportunities may include: auto sales, auto loan originations, service package sales, warranty sales, item sales, service times, add-on services sales, wait times associated with sold services (e.g., the time a customer waits for an auto service to be performed, the time a customer waits for an ordered food item to be received, the time a customer waits to receive a purchased item from "the back" at a big box retailer, and/or the like). Each of these sales and services may be automatically tracked as the sales and services are performed. For example, in order to perform a certain sale or service, an associate of employee may log into a branch front end system by entering associate credentials whereby the branch front end system may verify the entered credentials. A credential may be in the form of alpha-numeric characters; a biometric credential, such as voice, eye scan, finger or hand print; and/or a token-based credential, such as a badge or electronic token. Upon accessing the branch front end system, an associate may perform a sale and/or service, whereby the branch front end system processes the sale and/or service and records the details of the sale and/or service. The processed and recorded sale and/or service data from the branch front end system may then be transmitted to a backend system where all branch data is further processed. alternatively, branch data may be sent to a third party system for further processing and storing.

In an example embodiment, a backend system and/or a third party system may, in processing the received branch data, cleanse the data to detect and correct or remove corrupt, incomplete, inaccurate, and/or irrelevant data. A backend system and/or third party system may normalize the received branch data so that all received branch data is in the same units and judged relative to the same scale. A backend system and/or a third party system may, in processing the received branch data, standardize the data by, for example, transforming the data to have zero mean and unit variance. Once the backend system and/or third party system has processed the received branch data, the data may be stored in, for example, a tier 1 data set. Data for a tier 1 data set may be received at predetermined intervals, such as hourly, daily, every other day, weekly, monthly, or quarterly. Tier 1 data may be separated into account data and/or non-account data and/or it may be tagged as account data and/or non-account data when it is stored in a data storage unit. Account data may include, for example, account ID; account type; account balance; account transaction, deposit, and/or withdrawal; account owner; and the like. Non-account data may include, for example, sale and/or service type, employee ID, employee name, employee branch, employee supervisor, and the like.

Tier 1 data may then be used to generate tier 2 data. Tier 2 data may be generated by processing tier 1 data, such as, aggregating tier 1 data according to a specific tier 1 data, such as aggregating data by employee or aggregating data by branch. Tier 2 data may be generated by using business reference logic, such as using enterprise reference data to produce sales incentive metrics. Enterprise reference data may include, for example, product data, human resources data, and location data. The sales incentive metrics may then be stored in a data storage unit.

Tier 2 data may then be used to generate tier 3 data. Tier 3 data may be generated by processing tier 2 data to generate key performance indicators that may be relevant for branch and enterprise management. Tier 2 data, in contrast to tier 3 data, may be used by associate-level employees or associate supervisors in order to determine sales incentive metrics on a lower-scale level (such as by employee/associate or branch). In this manner, all tier 1 data, tier 2 sales incentives data, and tier 3 key performance indicator data is transparent across an enterprise.

FIG. 1 depicts an example system 100 for use with comprehensive sales and service event processing and reporting. System 100 may include a branch front end system 150, a backend system 130, a data storage 120, and a third party system 140, all connected over a network 110. For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Front end system 150, third party system 140, and backend system 130 may each include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The network-enabled computer systems may further include data storage. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

Front end system 150 may be a branch front end system, such as, for example, a system at a financial institution branch for entering and reporting sales and services that occur at the financial institution branch. Backend system 130 may be, for example, a SMART backend system for receiving, processing, and reporting on data received from a front end system 150. Moreover, a third party system 140 may perform any or all of the functions performed on a backend system 140 by receiving the data housed in data storage 120.

Figure 2:
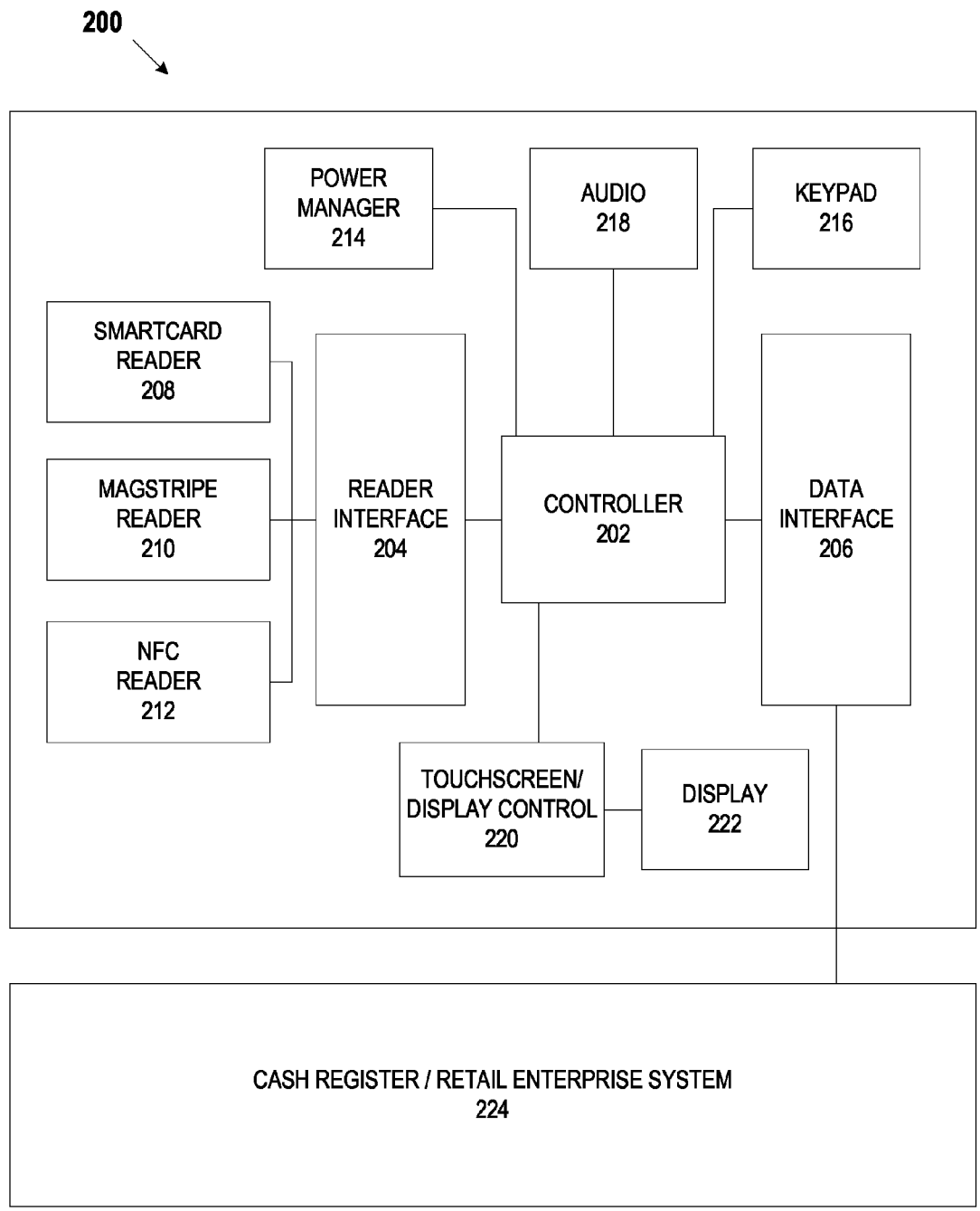
FIG. 2 is a schematic diagram illustrating an example of a front end point of sale system.

Front end systems (e.g., front end system 150) according to various examples, may be implemented in, for example, point of sale systems. FIG. 2 depicts an example Point of Sale (PoS) device 200. PoS device 200 may provide the interface at what a customer or end user makes a payment to the merchant in exchange for goods or services. PoS device 200 also may be utilized when providing branch sales and services to customers. In so doing, PoS device 200 may collect various sales and services data that may be used by sales and service event processing and reporting systems. In various embodiments, numerous features described with respect to PoS device 200 may be implemented into a front end system executing (e.g., front end system 150 client device 402). For example, the front end system may enable branch associates to provide branch services using PoS device 200.

PoS device 200 may include and/or cooperate with weighing scales, scanners, electronic and manual cash registers, electronic funds transfer at point of sale (EFTPOS) terminals, touch screens and any other wide variety of hardware and software available for use with PoS device 200. PoS device 200 may be a retail point of sale system and may include a cash register and/or cash register-like computer components to enable purchase transactions. PoS device 200 also may be a hospitality point of sale system and include computerized systems incorporating registers, computers and peripheral equipment, usually on a computer network to be used in restaurant, hair salons, hotels or the like. PoS device 200 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 200 also may be a cloud-based point of sale system that can be deployed as software as a service, which can be accessed directly from the Internet using, for example, an Internet browser.

Referring to FIG. 2, an example PoS device 200 is shown. PoS device 200 may include a controller 202, a reader interface 204, a data interface 206, a smartcard reader 208, a magnetic stripe reader 210, a near-field communications (NFC) reader 212, a power manager 214, a keypad 216, an audio interface 218, a touchscreen/display controller 220, and a display 222. Also, PoS device 200 may be coupled with, integrated into or otherwise connected with a cash register/retail enterprise system 224.

In various embodiments, controller 202 may be any controller or processor capable of controlling the operations of PoS device 200. For example, controller 202 may be a Intel® 2nd Generation Core™ i3 or i5 or Pentium™ G850 processor or the like. Controller 202 also may be a controller included in a personal computer, smartphone device, tablet PC or the like.

Reader interface 204 may provide an interface between the various reader devices associated with PoS device 200 and PoS device 200. For example, reader interface 204 may provide an interface between smartcard reader 208, magnetic stripe reader 210, NFC reader 212 and controller 202. In various embodiments, reader interface 204 may be a wired interface such as a USB, RS222 or RS485 interface and the like. Reader interface 204 also may be a wireless interface and implement technologies such as Bluetooth, the 802.11(x) wireless specifications and the like. Reader interface 204 may enable communication of information read by the various reader devices from the various reader devices to PoS device 200 to enable transactions. For example, reader interface 204 may enable communication of a credit or debit card number read by a reader device from that device to PoS device 200. In various embodiments, reader interface 204 may interface between PoS device 200 and other devices that do not necessarily "read" information but instead receive information from other devices.

Data interface 206 may allow PoS device 200 to pass communicate data throughout PoS device and with other devices including, for example, cash register/retail enterprise system 224. Data interface 206 may enable PoS device 200 to integrate with various customer resource management (CRM) and/or enterprise resource management (ERP) systems. Data interface 206 may include hardware, firmware and software that make aspects of data interface 206 a wired interface. Data interface 206 also may include hardware, firmware and software that make aspects of data interface 206 a wireless interface. In various embodiments, data interface 206 also enables communication between PoS device other devices.

Smartcard reader 208 may be any electronic data input device that reads data from a smart card. Smartcard reader 208 may be capable of supplying an integrated circuit on the smart card with electricity and communicating with the smart card via protocols, thereby enabling read and write functions. In various embodiments, smartcard reader 208 may enable reading from contact or contactless smart cards. Smartcard reader 208 also may communicate using standard protocols including ISO/IEC 7816, ISO/IEC 14443 and/or the like or proprietary protocols.

Magnetic stripe reader 210 may be any electronic data input device that reads data from a magnetic stripe on a credit or debit card, for example. In various embodiments, magnetic stripe reader 210 may include a magnetic reading head capable of reading information from a magnetic stripe. Magnetic stripe reader 210 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., ormat A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments. Track 3 transmission channels also may be used to transmit, for example, geolocation data associated with a user, product data relating to the purchase (e.g., product information, stock keeping unit (SKU) level data, and/or any other information that may be used to provide purchase-driven smart statements. PoS device 200 may communicate and or cooperate with the user device to provide the information into track 3 transmission channels. Other methods for providing product level data to a financial institution. For example, a merchant can transmit the product data for each transaction to a financial institution along with information that identifies the transaction.

NFC reader 212 may be any electronic data input device that reads data from a NFC device. In an exemplary embodiment, NFC reader 212 may enable Industry Standard NFC Payment Transmission. For example, the NFC reader 212 may communicate with a NFC enabled device to enable two loop antennas to form an air-core transformer when placed near one another by using magnetic induction. NFC reader 212 may operate at 13.56 MHz or any other acceptable frequency. Also, NFC reader 212 may enable a passive communication mode, where an initiator device provides a carrier field, permitting answers by the target device via modulation of existing fields. Additionally, NFC reader 212 also may enable an active communication mode by allowing alternate field generation by the initiator and target devices.

In various embodiments, NFC reader 212 may deactivate an RF field while awaiting data. NFC reader 212 may receive communications containing Miller-type coding with varying modulations, including 100% modulation. NFC reader 212 also may receive communications containing Manchester coding with varying modulations, including a modulation ratio of approximately 10%, for example. Additionally, NFC reader 212 may be capable of receiving and transmitting data at the same time, as well as checking for potential collisions when the transmitted signal and received signal frequencies differ.

NFC reader 212 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 212 may be able to utilize transmission protocols and methods that are developed in the future using other frequencies or modes of transmission. NFC reader 212 also may be backwards-compatible with existing payment techniques, such as, for example RFID. Also, NFC reader 212 may support transmission requirements to meet new and evolving payment standards including internet based transmission triggered by NFC. In various embodiments, NFC reader 212 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 214 may be any microcontroller or integrated circuit that governs power functions of PoS device 200. Power manager 214 may include, for example, firmware, software, memory, a CPU, a CPU, input/output functions, timers to measure intervals of time, as well as analog to digital converters to measure the voltages of the main battery or power source of PoS device 200. In various embodiments, Power manager 214 remain active even when PoS device 200 is completely shut down, unused, and/or powered by the backup battery. Power manager 214 may be responsible for coordinating many functions, including, for example, monitoring power connections and battery charges, charging batteries when necessary, controlling power to other integrated circuits within PoS device 200 and/or other peripherals and/or readers, shutting down unnecessary system components when they are left idle, controlling sleep and power functions (on and off), managing the interface for built-in keypad and trackpads, and/or regulating a real-time clock (RTC).

Keypad 216 may any input device that includes a set of buttons arranged, for example, in a block or pad and may bear digits, symbols and/or alphabetical letters. Keypad 216 may be a hardware-based or mechanical-type keypad and/or implemented in software and displayed on, for example, a screen or touch screen to form a keypad. Keypad 216 may receive input from a user that pushed or otherwise activates one or more buttons on keypad 216 to provide input.

Audio interface 218 may be any device capable of providing audio signals from PoS device 200. For example, audio interface may be a speaker or speakers that may produce audio signals. In various embodiments, audio interface 218 may be integrated within PoS device 200. Audio interface 218 also may include components that are external to PoS device 200.

Touchscreen/display control 220 may be any device or controller that contrals an electronic visual display. Touchscreen/display control 220 may allow a user to interact with PoS device 200 through simple or multi-touch gestures by touching a screen or display (e.g., display 222). Touchscreen/display control 220 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 220 may receive inputs from the touchscreen and process the received inputs. Touchscreen/display control 220 also may control the display on PoS device 200, thereby providing the graphical user interface on a display to a user of PoS device 200.

Display 222 may be any display suitable for a PoS device. For example, display 222 may be a TFT, LCD, LED or other display. Display 222 also may be a touchscreen display that for example allows a user to interact with PoS device 200 through simple or multi-touch gestures by touching a screen or display (e.g., display 222). Display 222 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 222 may receive inputs from control gestures provided by a user. Display 222 also may display images, thereby providing the graphical user interface to a user of PoS device 200.

Cash register/retail enterprise system 224 may me any device or devices that cooperate with PoS device 200 to process transactions. Cash register/retail enterprise system 224 may be coupled with other components of PoS device 200 via, for example, a data interface (e.g., data interface 206) as illustrated in FIG. 2. Cash register/retail enterprise system 224 also may be integrated into PoS device 200.

In various embodiments, cash register/retail enterprise system 224 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 224 may comprise an retail enterprise system and/or a customer relationship management system. Retail enterprise system 224 may enable retain enterprises to manage operations and performance across a retail operation (e.g., a bank branch operation, an auto sales operation, a big box retailer, and/or the like). Retail enterprise system 224 may be a stand-alone application in, for example, individual stores or branches, or may be interconnected via a network (e.g., a branch netowrk). Retail enterprise system 224 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date. issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 224 also may include inventory control and tracking capabilities, reporting tools, customer management capabilities, employee management tools, and may integrate with other accounting software.

Figure 3:
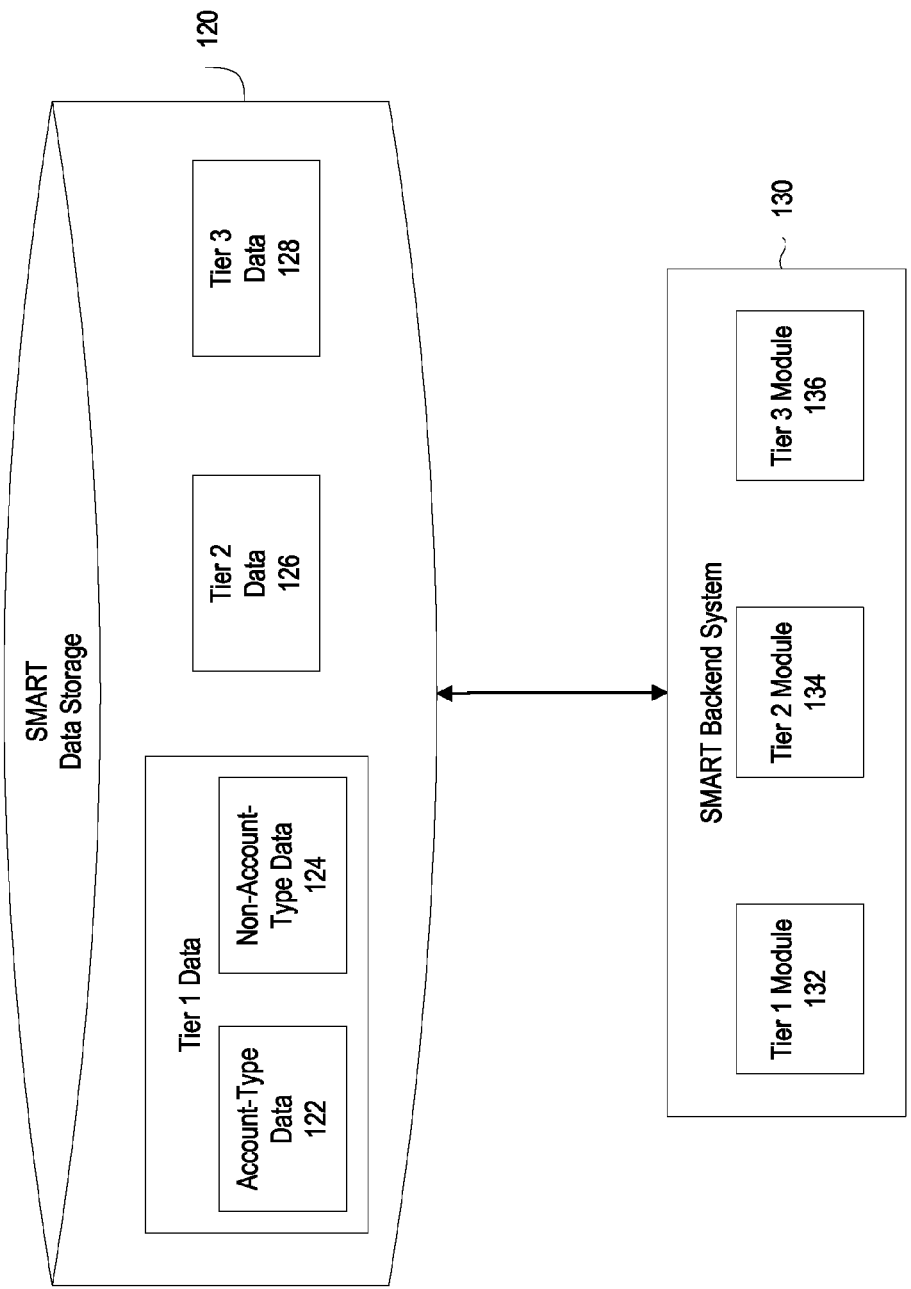
FIG. 3 is a block diagram of a hardware components of an example system for comprehensive sales and service event processing and reporting.

FIG. 3 illustrates a block diagram of a hardware components of a system for comprehensive sales and service event processing and reporting according to a particular embodiment and specifically the components of a backend system 130 and a data storage 120. Additionally, various components of the backend system 130 may alternatively reside on a third party system 140 as disclosed herein.

Data storage 120 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, financial institution data storage 120 may be a database, such as an Oracle database, a Microsoft SQL Server database, a DB2 database, a MySQL database, a Sybase database, an object oriented database, a hierarchical database, or other database. Financial institution data storage 120 may utilize flat file structures for storage of data.

Backend system 130 may include a tier 1 module 132 for processing data received from a branch font end system 150 in order to generate tier 1 data. For example, a tier 1 module 132 may tag the data received from a front end system 150 as account data or non-account data. Account data may include, for example, account ID; account type; account balance; account transaction, deposit, and/or withdrawal; account owner; and the like. Non-account data may include, for example, sale and/or service type, employee ID, employee name, employee branch, employee supervisor, and the like. Once the tier 1 data is tagged, the tier 1 data may then be stored in a tier 1 data storage 122 data storage 120. Tier 1 data may be stored in account-type data storage 123 and non-account type data 124 for security purposes. Tier 1 data may be pulled from data storage 120 for presentation at a front end system 150. Additionally, data from a font end system 150 may be received at a backend system 130 at predetermined intervals, such as hourly, daily, every other day, weekly, monthly, or quarterly.

Backend system 130 may also include a tier 2 module 134. Tier 2 module 134 may use tier 1 data 122 to generate tier 2 data 126. Tier 2 module 134 may aggregate tier 1 data 122 according to a specific tier 1 data, such as aggregating data by employee or aggregating data by branch. Tier 2 module 134 may also use business reference logic, such as using enterprise reference data to produce sales incentive metrics. Enterprise reference data may include, for example, product data, human resources data, and location data. The sales incentive metrics may then be stored as tier 2 data 126 in a data storage unit 120.

Backend system 130 may also include a tier 3 module 136. Tier 3 module 136 may use tier 2 data 126 to generate tier 3 data 128. Tier 3 module 136 may process tier 2 data to generate key performance indicators and store those key performance indicators as tier 3 data. Key performance indicators that may be relevant for branch and enterprise management. Tier 2 data 126, in contrast to tier 3 data 128, may be used by associate-level employees or associate supervisors in order to determine sales incentive metrics on a lower-scale level (such as by employee/associate or branch). In this manner, all tier 1 data 122, tier 2 sales incentives data 126, and tier 3 key performance indicator data 128 is available by accessing a data storage 120. Access to data storage 120 may require appreciate credentials. Accordingly, credentials may limit access to specific data sources. For example, a branch associate may be able to access tier 1 data 122 and tier 2 data but may not be able to access tier 3 data.

Figure 4:
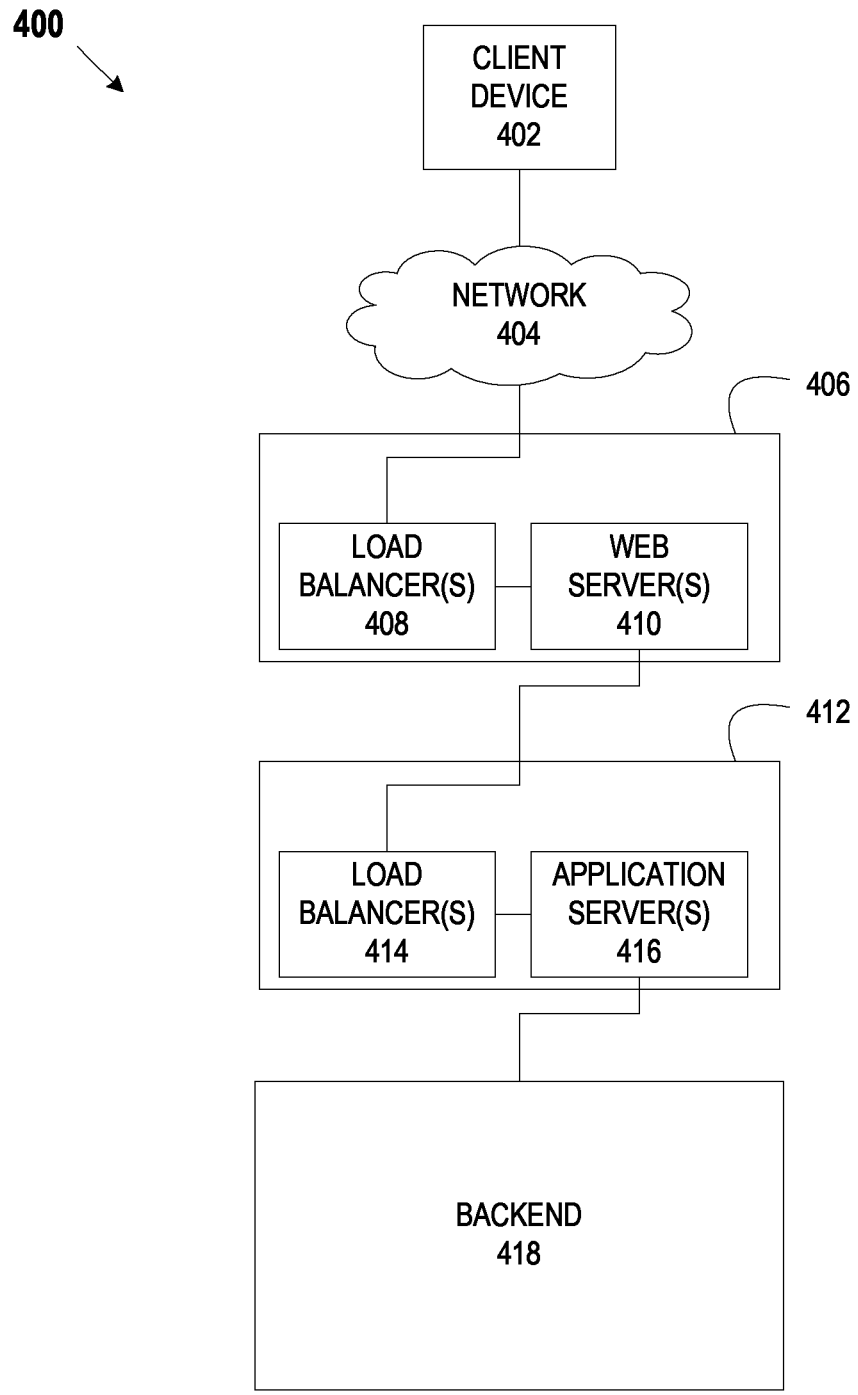
FIG. 4 is a schematic diagram illustrating an example system for comprehensive sales and service event processing and reporting.

Backend systems (e.g., backend system 130) may be implemented into, for example, a distributed computing environment where, for example, a client device (e.g., client device 402) may be similar to a front end system (e.g., front end system 150) that communicates with a backend (e.g., backend 418). FIG. 4 depicts an example system 400 that may enable a financial institution, for example, to provide network services (e.g., branch banking services) to its customers and/or branch associates. As shown in FIG. 4, system 400 may include a client device 402 (e.g., a front end system), a network 404, a front-end controlled domain 406, a back-end controlled domain 412, and a backend 418. Front-end controlled domain 406 may include one or more load balancers 408 and one or more web servers 410. Back-end controlled domain 412 may include one or more load balancers 414 and one or more application servers 416.

Client device 402 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 400 may execute one or more software applications to enable, for example, network communications.

Client device 402 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 404 may be one or more of a wireless network, a wired network, or any combination of a wireless network and a wired network. For example, network 404 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 404 may include, without limitation, telephone lines, fiber optics, IEEE Ethernet 902.3, a wide area network (WAN), a local area network (LAN) or a global network such as the Internet. Also, network 404 may support an Internet network, a wireless communication network, a cellular network, or the like, or any combination thereof. Network 404 may further include one network, or any number of example types of networks mentioned above, operating as a stand-alone network or in cooperation with each other. Network 404 may utilize one or more protocols of one or more network elements to which they are communicatively couples. Network 404 may translate to or from other protocols to one or more protocols of network devices. Although network 404 is depicted as a single network, it should be appreciated that according to one or more embodiments, network 404 may comprise a plurality of interconnected networks, such as, for example, the Internet, a service provider's network, a cable television network, corporate networks, and home networks.

Front-end controlled domain 406 may be implemented to to provide security for backend 418. Load balancer(s) 408 may distribute workloads across multiple computing resources, such as, for example computers, a computer cluster, network links, central processing units or disk drives. In various embodiments, load balancer(s) 410 may distribute workloads across, for example, web server(S) 416 and/or backend 418 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 408 may include software that monitoring the port where external clients, such as, for example, client device 402, connect to access various services of a financial institution, for example. Load balancer(s) 408 may forward requests to one of the application servers 416 and/or backend 418 servers, which may then reply to load balancer 408. This may allow load balancer(s) 408 to reply to client device 402 without client device 402 ever knowing about the internal separation of functions. It also may prevent client devices from contacting backend servers directly, which may have security benefits by hiding the structure of the internal network and preventing attacks on backend 418 or unrelated services running on other ports, for example.

A variety of scheduling algorithms may be used by load balancer(s) 408 to determine which backend server to send a request to. Simple algorithms may include, for example, random choice or round robin. Load balancers 408 also may account for additional factors, such as a server's reported load, recent response times, up/down status (determined by a monitoring poll of some kind), number of active connections, geographic location, capabilities, or how much traffic it has recently been assigned.

Load balancers 408 may be implemented in hardware and/or software. Load balancer(s) 408 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 410 may include hardware (e.g., one or more computers) and/or software (e.g., one or more applications) that deliver web content that can be accessed by, for example a client device (e.g., client device 402) through a network (e.g., network 404), such as the Internet. In various examples, web servers, may deliver web pages, relating to, for example, online banking applications and the like, to clients (e.g., client device 402). Web server(s) 410 may use, for example, a hypertext transfer protocol (HTTP or sHTTP) to communicate with client device 402. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 410 may respond with the content of that resource or an error message if unable to do so. The resource may be, for example a file on stored on backend 418. Web server(s) 410 also may enable or facilitate receiving content from client device 402 so client device 402 may be able to, for example, submit web forms, including uploading of files.

Web server(s) also may support server-side scripting using, for example, Active Server Pages (ASP), PHP, or other scripting languages. Accordingly, the behavior of web server(s) 410 can be scripted in separate files, while the actual server software remains unchanged.

Load balancers 414 may be similar to load balancers 408 as described above.

Application server(s) 416 may include hardware and/or software that is dedicated to the efficient execution of procedures (e.g., programs, routines, scripts) for supporting its applied applications. Application server(s) 416 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 416 may act as a set of components accessible to, for example, a financial institution or other entity implementing system 400, through an API defined by the platform itself. For Web applications, these components may be performed in, for example, the same running environment as web server(s) 410, and application servers 416 may support the construction of dynamic pages. Application server(s) 416 also may implement services, such as, for example, clustering, fail-over, and load-balancing. In various embodiments, where application server(s) 416 are Java application servers, the web server(s) 416 may behaves like an extended virtual machine for running applications, transparently handling connections to databases associated with backend 418 on one side, and, connections to the Web client (e.g., client device 402) on the other.

Backend 418 may include hardware and/or software that enables the backend services of, for example, a financial institution or other entity that maintains a distributes system similar to system 400. For example, backend 418 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 418 also may include branch sales and service event processing and reporting systems. Backend 418 may be associated with various databases, including account databases that maintain, for example, customer account information, product databases that maintain information about products and services available to customers, content databases that store content associated with, for example, a financial institution, and the like. Backend 418 also may be associated with one or more servers that enable the various services provided by system 400.

Figure 5:
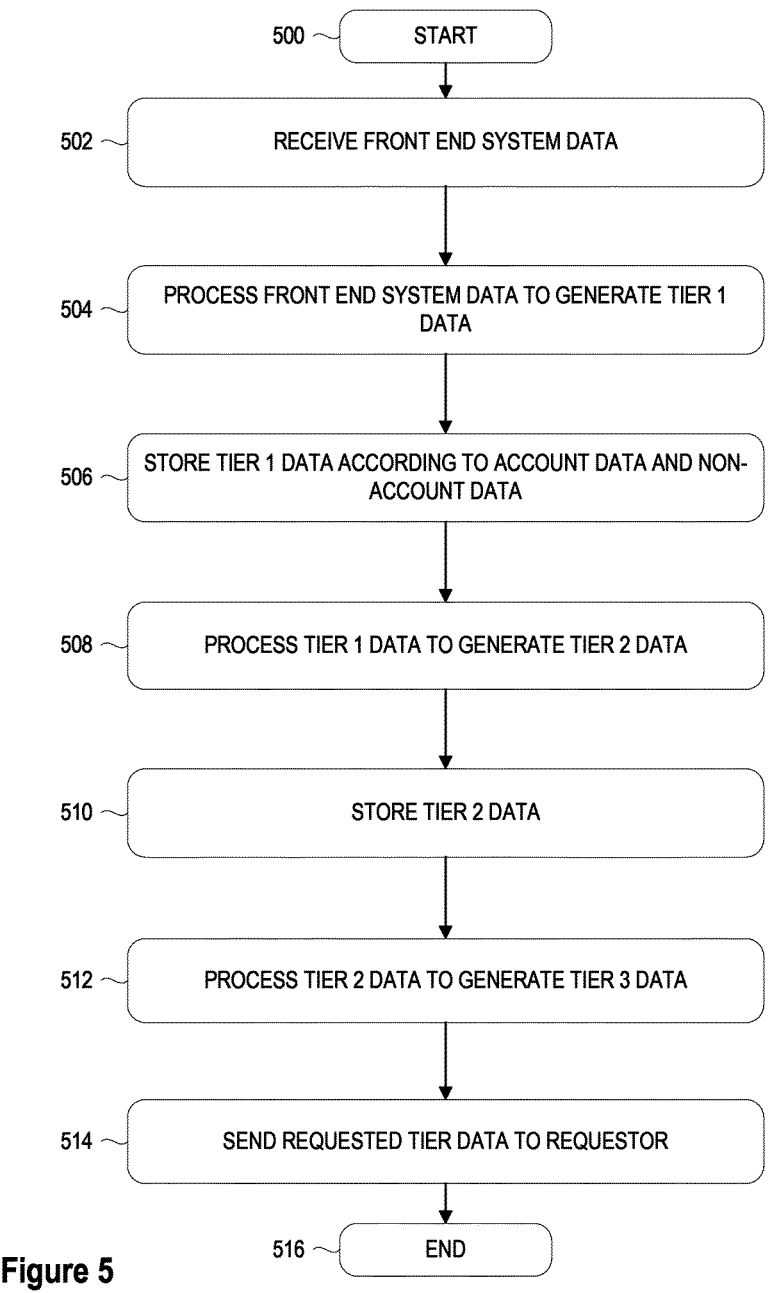
FIG. 5 is a flowchart illustrating an example method for comprehensive sales and service event processing and reporting.

FIG. 5 is a flowchart illustrating a method for comprehensive sales and service event processing and reporting according to a particular embodiment. The method begins at step 500. At step 502, data recorded at a front end system 150 may be received at a back end system 150. Data recorded at a front end system may be pertaining to and sales or service transaction processed at a front end system 150. For example, services and sales opportunities may include: credit card account sales, savings account sales, checking account sales, home loan sales, auto loan sales, Roth IRA account sales, Traditional IRA account sales, 401K account saves, 403b account sales, Coverdell account sales, 529 account sales, credit card sales business checking account sales, business saving account sales, business credit card sales, business loan sales, direct deposit services, rollover account services, bill pay services, deposit services, withdrawal services, referral services, activation services, and the like.

At step 504, a back end system 150 may process the data received from the front end system 150 using a tier 1 module 132 to generate tier 1 data 122, which may then be stored in step 506 in a data storage unit 120. Tier 1 processing may include tagging data with an account data tag or a non-account data tag. Accordingly, tier 1 data may be stored in a data storage 120 according to account data 123 and non-account data 124. At step 508, a backend system 150 may process tier 1 data to generate tier 2 data using a tier 2 module 134. Tier 2 data may include aggregated, normalized, and/or standardized tier 1 data to produce sales incentive metrics as tier 2 data. At step 510, the sales incentive metrics may then be stored as tier 2 data 126 in a data storage unit 120.

At step 512, a backend system 150 may process tier 2 data 126 using a tier 3 module 136 to generate tier 3 data 128. Tier 3 data 128 may include aggregated tier 2 data to illustrate key performance indicators on an enterprise-wide level. Tier 2 data 126, in contrast to tier 3 data 128, may be used by associate-level employees or associate supervisors in order to determine sales incentive metrics on a lower-scale level (such as by employee/associate or branch).

At step 514, front end system 150 may request tier data from back end system 150, such as tier 1 data, tier 2 data, and/or tier 3 data. A front end system 150 may require authorization credentials to be used in a request for tier data in order to confirm that front end system 150 is authorized to receive the requested tier data. Moreover, a front end system 150 may request tier data in a variety of formats and display the tier data according to a format requested. The method may end at step 516.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A system comprising:
   a front-end device comprising:
      a computer processor that receives, via a network, front end data, wherein front end data includes sales and service data relevant to the front end device; and
      a front-end input/output interface; and
   a backend device comprising:
   a backend input/output interface in communication with the front-end device input/output interface that receives the front end data;
   a first data processor that categorizes the front end data according to account specific data and non-account specific data, thereby generating first data;
   a second data processor that processes the first data according a set of second data processing rules thereby creating a second data, the second data processing rules including at least one of: aggregation of the first data according to a first selected variable; normalization of the first data; and standardization of the first data; and
   a third data processor that processes the second data according to a set of third data processing rules thereby creating a third data, the third data processing rules including aggregation of the second data according to a second selected variable;
   wherein the backend device transmits the first data, second data, and third data to the front-end device via the backend input/output interface to display on the front-end input/output interface key performance indicators based on the third data and sales incentive metrics based on the second data, wherein the backend input/output interface comprises a back-end controlled domain comprising a load balancer and a backend application server;
      wherein the front-end device and the backend device are in communication over a secure network; and
      wherein the first, second, and third data processors are different processors.

2. The system according to claim 1, wherein the front end device is a branch banking device and the front end data is associated with branch banking sales and services.

3. The system according to claim 1, wherein the front-end computer processor receives front end data at a predetermined interval.

4. The system according to claim 1, wherein the first data is generated by separating the account data from the non-account data.

5. The system according to claim 1, wherein the first data is generated by tagging the account and non-account data.

6. The system according to claim 1, wherein the second data is generated using business reference logic.

7. The system according to claim 1, wherein the third data is used to determine sales incentive metrics.

8. The system according to claim 1, wherein the third data is key performance indicator data.

9. A method comprising:
   receiving, at a backend device via a secure network, data from a front end device;
   categorizing, using a first data processor of the backend device, the data according to account data and non-account data, thereby generating a first data;
   processing, using a second data processor of the backend device, the first data according to at least one first processing rule to generate a second data, the at least one first processing rule including at least one of: aggregation of the first data according to a first selected variable; normalization of the first data; and standardization of the first data;
   processing, using a third data processor of the backend device, the second data according to a second processing rules including aggregation of the second data according to a second selected variable to generate a third data; and
   transmitting the first data, second data, and third data to the front end device via the secure network using a backend input/output interface, wherein one or more key performance indicators and one or more sales metrics are displayed on the front end device via a front-end input/output interface, and wherein the key performance indicators are based on the third data and the sales inventive metrics are based on the second data, wherein the backend input/output interface comprises a back-end controlled domain comprising a load balancer and a backend application servers;
   wherein the first, second, and third data processors are different processors.

10. The method according to claim 9, wherein the front end device is a branch banking device and the front end data is associated with branch banking sales and services.

11. The method according to claim 9, further comprising receiving front end data, via the network, at a predetermined interval.

12. The method according to claim 9, further comprising generating the first data by separating the account data from the non-account data.

13. The method according to claim 9, further comprising generating the first data by tagging the account and non-account data.

14. The method according to claim 9, further comprising generating the second data using business reference logic.

15. The method according to claim 9, further comprising using the third data to determine sales incentive metrics.

16. The method according to claim 9, wherein the third data is key performance indicator data.

* * * * *